United States Patent
Li et al.

(10) Patent No.: US 10,133,025 B2
(45) Date of Patent: Nov. 20, 2018

(54) OPTICAL APPARATUS CAPABLE OF EXTERNAL CALIBRATION FOR OPTICAL DEVICE

(71) Applicants: Hisense Co., Ltd., Qingdao, Shandong (CN); Hisense USA Corporation, Suwanee, GA (US)

(72) Inventors: Qiang Li, Shandong (CN); Wensheng Lu, Shandong (CN)

(73) Assignees: HISENSE CO., LTD., Qingdao, Shandong (CN); HISENSE USA CORPORATION, Suwanee, GA (US)

(*) Notice: Subject to any disclaimer, the term of this patent is extended or adjusted under 35 U.S.C. 154(b) by 0 days.

(21) Appl. No.: 15/436,188

(22) Filed: Feb. 17, 2017

(65) Prior Publication Data

US 2017/0160517 A1     Jun. 8, 2017

Related U.S. Application Data

(63) Continuation of application No. 14/531,021, filed on Nov. 3, 2014, now Pat. No. 9,606,322.

(30) Foreign Application Priority Data

Nov. 6, 2013 (CN) .......................... 2013 1 0545674

(51) Int. Cl.
  *G02B 7/182* (2006.01)
(52) U.S. Cl.
  CPC .................................. *G02B 7/1825* (2013.01)
(58) Field of Classification Search
  CPC ...... G02B 7/198; G02B 7/1822; G02B 7/182; G02B 7/1825
  USPC ....................................................... 362/257
  See application file for complete search history.

(56) References Cited

U.S. PATENT DOCUMENTS

| | | | |
|---|---|---|---|
| 4,648,692 A * | 3/1987 | Kinoshita | ............... H01S 3/005 248/476 |
| 5,140,470 A | 8/1992 | Luecke | |
| 5,418,652 A | 5/1995 | Gnann | |
| 5,798,879 A | 8/1998 | Salvio | |
| 2009/0279055 A1 | 11/2009 | Amano | |
| 2010/0207005 A1* | 8/2010 | Chang | .................. G02B 7/1825 248/574 |

FOREIGN PATENT DOCUMENTS

| | | |
|---|---|---|
| CN | 2656967 Y | 11/2004 |
| CN | 103149664 | 6/2013 |
| CN | 103149664 A | 6/2013 |
| CN | 203232192 U | 10/2013 |
| JP | 2003-262781 A | 9/2003 |
| JP | 4586110 B1 | 11/2010 |

* cited by examiner

*Primary Examiner* — Karabi Guharay

(74) *Attorney, Agent, or Firm* — Boyle Fredrickson, S.C.

(57) ABSTRACT

The present invention provides an optical apparatus, which is configured to output image information and comprises a housing; a light source; an optical device; an optical device carrier, wherein the optical device is mounted on the optical device carrier and positioned on one side of the optical device carrier; a support plate positioned on the other side of the optical device carrier and being one part of the housing; and a connecting piece, wherein one end of the connecting piece penetrates the support plate and then is connected with the optical device carrier, and the relative positions of the connecting piece and the support plate are fixed.

15 Claims, 7 Drawing Sheets

OPTICAL APPARATUS CAPABLE OF EXTERNAL CALIBRATION FOR OPTICAL DEVICE

CROSS-REFERENCE TO RELATED APPLICATION

This application is a continuation of the U.S. application Ser. No. 14/531,021, filed Nov. 3, 2014, which claims the benefit and priority of Chinese Patent Application No. 201310545674.5 filed Nov. 6, 2013. The entire disclosure of the above application is incorporated herein by reference.

FIELD OF THE INVENTION

The present invention relates to the field of optical apparatuses and particularly to an optical apparatus capable of outputting image information.

BACKGROUND OF THE INVENTION

Certain errors may be produced in production, assembly and debugging processes of an optical apparatus and these errors may cause a whole output optical path to deviate from an originally designed optical path. Therefore, calibration may need to be performed before normal use and an optical device in the optical apparatus is further fixed after the calibration.

SUMMARY OF THE INVENTION

An embodiment of the invention provides an optical apparatus, which is configured to output image information and comprises: a housing; a light source; an optical device; an optical device carrier, wherein the optical device is mounted on the optical device carrier and positioned on one side of the optical device carrier; a support plate positioned on the other side of the optical device carrier and being one part of the housing; and a connecting piece, wherein one end of the connecting piece penetrates the support plate and then is connected with the optical device carrier, and the relative positions of the connecting piece and the support plate are fixed.

An embodiment of the present invention discloses an optical apparatus, which is configured to output image information and includes a housing; a light source; an optical device; an optical device carrier, wherein the optical device is mounted on the optical device carrier and positioned on one side of the optical device carrier; a support plate positioned on the other side of the optical device carrier; at least three connecting pieces, wherein the first end of each connecting piece penetrates the support plate and then is in bolt connection with the optical device carrier, the relative positions of the connecting pieces and the support plate are fixed, the optical device carrier is supported on the support plate through the connecting pieces, and the connection points of the connecting pieces on the optical device carrier are not positioned on the same straight line; and first elastic elements disposed between the optical device carrier and the support plate.

An embodiment of the present invention discloses an optical apparatus, which is configured to output image information and includes a housing; a light source; an optical device; an optical device carrier, wherein the optical device is mounted on the optical device carrier and positioned on one side of the optical device carrier; a support plate positioned on the other side of the optical device carrier; and at least three connecting pieces, wherein the first end of each connecting piece penetrates the support plate and then is connected with the optical device carrier, the relative positions of the connecting pieces and the support plate are fixed, the optical device carrier is supported on the support plate through the connecting pieces, and the connection points of the connecting pieces on the optical device carrier are not positioned on the same straight line.

In these figures, the corresponding relations between various components and reference symbols of FIG. 1-FIG. 8 are as follows:

10: optical device carrier; 11: stud; 20: support plate; 21: stepped hole; 30: connecting piece; 40: first spring; 50: second spring; 60: spacer; 70: auxiliary positioning device, 71: positioning column; 72: mounting blind hole; 73: boss; 91: optical device; 92: first lens; 93: second lens.

DETAILED DESCRIPTION OF THE EMBODIMENTS

In order to understand the above objects, features and advantages of the present invention more clearly, the present invention will be further described below in combination with the drawings and embodiments. It needs to be noted that, the embodiments of the application and the features in the embodiments may be combined to each other without conflicts.

Many specific details are described in the following description to facilitate the full understanding of the present invention. However, the present invention may also adopt other ways which are different from the description for implementation, so that the present invention is not limited to the specific embodiments disclosed below.

Figure 1:
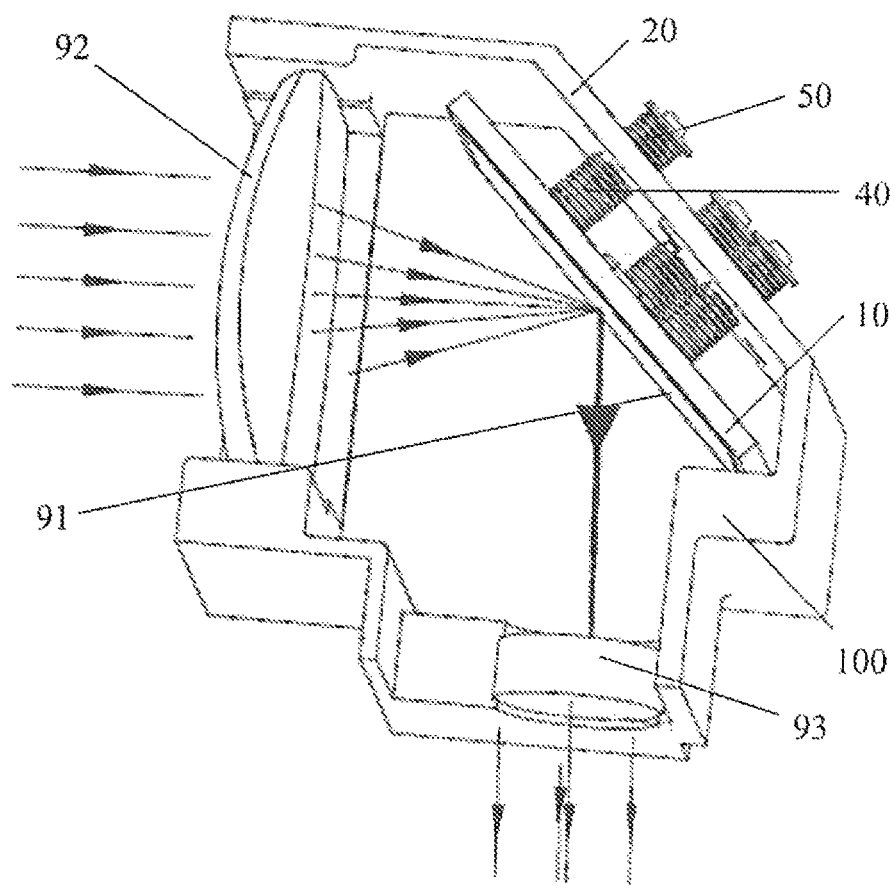
FIG. 1 is a schematic diagram of partial structure of an optical apparatus according to an embodiment of the present invention.

An optical apparatus, such as an optical projection apparatus, generally includes a light source and a housing surrounding the light source, and an optical path is configured in the housing for transmitting light emitted by the light source. Various optical devices for performing light treatment may exist in the optical path, such as the optical devices for realizing reflective treatment, refractive treatment, convergence treatment, divergence treatment and attenuation treatment, etc. As shown in FIG. 1, a schematic diagram of partial structure of an optical apparatus according to an embodiment is given out, the optical apparatus herein may be an optical projection apparatus, and of course, may be other optical apparatuses, such as an optical observation apparatus and the like, and the present invention is not limited to thereto. As shown in the figure, the optical apparatus includes a light source (not shown), light emitted by the light source is converged onto an optical device 91 after passing through a first lens 92, achieves a second lens 93 after being acted by the optical device 91 and is output after passing through the second lens 93; and the light source, the first lens 92, the second lens 93 and the optical device 91 may be positioned in a housing 100 of the optical apparatus.

After the calibration of the optical apparatus has been completed, the position of the optical device 91 relative to the housing is fixed. The fixation way and the respective structures of parts of the optical device 91 are given out in FIG. 2-FIG. 8. As shown in the figures, the optical device 91 is mounted on an optical device carrier 10 and positioned on one side of the optical device carrier 10; and the optical device 91 may be a reflective device (such as a reflector and the like) or a refractive device (such as a prism and the like). Of course, the optical device may also be a concave/convex lens or a concave/convex mirror or an optical attenuation device (such as a light-absorbing, material and the like) or the like. A support plate 20 is positioned on the other side of the optical device carrier 10. In one embodiment of the present invention, the support plate 20 positioned on the other side of the optical device carrier 10 is one part of the housing, so that calibration staff may perform calibration operation from the outside more easily and further reduce the possibility that the light emitted by the light source abnormally irradiates external space.

The optical apparatus further includes connecting pieces 30, wherein each connecting piece 30 in the embodiment includes two ends, one end is the first end and the other end is the second end. The first end of each connecting piece 30 penetrates the support plate 20 and then is in bolt connection with the optical device carrier 10 and the optical device carrier 10 is supported on the support plate 20 through the connecting pieces; the second end of each connecting piece 30 is used for adjustment in a calibration stage, namely, before the completion of calibration, the second end of each connecting piece may be rotated to adjust the distance and the included angle between the optical device carrier 10 and the support plate 20, and after the completion of calibration, the connecting pieces are fixed and the positions of the connecting pieces relative to the support plate 20 will not change; and the connecting pieces 30 may be bolts, screws and the like. In the embodiment, three connecting pieces 30 are included and the connection points of the three connecting pieces 30 on the optical device carrier 10 are not positioned on the same straight line.

Adhesives are coated at the parts where the connecting pieces 30 penetrate and are connected with the support plate 20, so that the relative positions of the connecting pieces and the support plate may be fixed, and the relative position of the optical device is also fixed, thereby keeping the effect after the completion of calibration is further achieved. Simultaneously, via holes of the support plate 20 are configured for penetration of the connecting pieces 30 and the inner diameters of the via holes are larger than the outer diameters of the parts of the connecting pieces positioned in the via holes.

First springs 40 are regarded as first elastic elements and are supported between the optical device carrier 10 and the support plate 20, wherein the number of the first springs 40 may be the same as that of the connecting pieces 30 and may also be less than that of the connecting pieces 30.

Second springs 50 are regarded as second elastic elements and positioned between the second ends of the connecting pieces 30 and the support plate 20, wherein the number of the second springs 50 is the same as that of the connecting pieces 30 or less than that of the connecting pieces 30.

According to the embodiment, the optical device may be translated along the normal direction, and the two-dimensional tilt angle of the optical device may also be adjusted.

The second springs 50 are disposed between the second ends of the connecting pieces 30 and the support plate 20 (which may be sheathed on the connecting pieces 30), so that the adjustment range of the included angles between the connecting pieces and the optical device may be increased in the calibration stage and thus further expanding the adjustment range of the optical device; and the first springs 40 and the connecting pieces 30 may be separately disposed, and the first springs 40 may be supported between the support plate 20 and the optical device carrier 10 and may also be sheathed on the connecting pieces and supported between the support plate and the optical device carrier.

The numbers of the connecting pieces, the first springs and the second springs are respectively correspondingly set as three, thereby facilitating adjustment and control of the optical device in the calibration stage, reducing adjustment time and improving adjustment efficiency; and of course, four connecting pieces, four first springs and four second springs may also be selected, and the positions where the four connecting pieces are connected with the optical device carrier are positioned on four vertexes of a rectangle. In one embodiment of the present invention, the number of the connecting pieces may be less than 3, for example, 1 or 2, and the first spring and the second spring may be configured for each connecting piece in the above-mentioned way; and at this time, the adjustment stability and efficiency in the calibration stage may be lower than those in the situation of adopting three or more connecting pieces, but the situation is still within the protection scope of the present invention. However, the first elastic elements and the second elastic elements are not limited to the springs and may also adopt the form of spring pieces.

Figure 3:
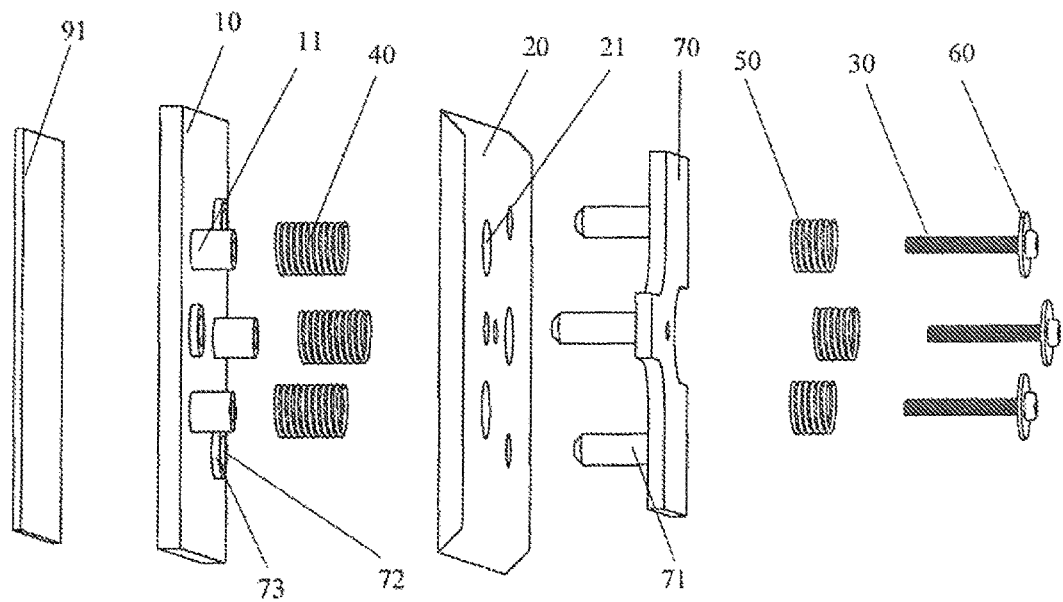
FIG. 3 is a schematic diagram of breakdown structure of FIG. 2.
Figure 8:
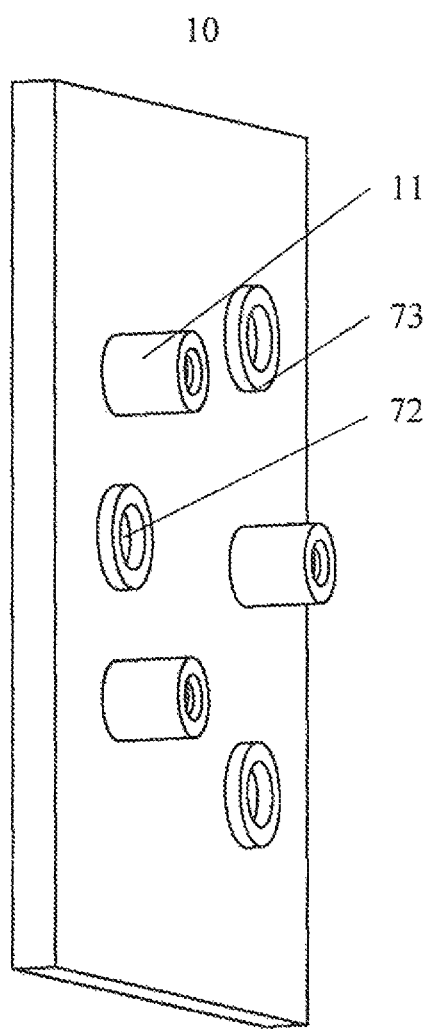
FIG. 8 is a schematic diagram of structure of the optical device carrier in FIG. 2.

In one embodiment of the present invention, as shown in FIG. 3 and FIG. 8, studs 11 are disposed on the optical device carrier 10, the first springs 40 are sheathed on the studs 11 and the connecting pieces 30 may be screwed into the studs 11. In the embodiment, the studs are disposed on the optical device carrier, the translation distance in the front and back direction may be increased in the calibration stage and the debugging range of the optical device may be further expanded; and simultaneously, the thickness of the optical device carrier may be reduced.

Figure 7:
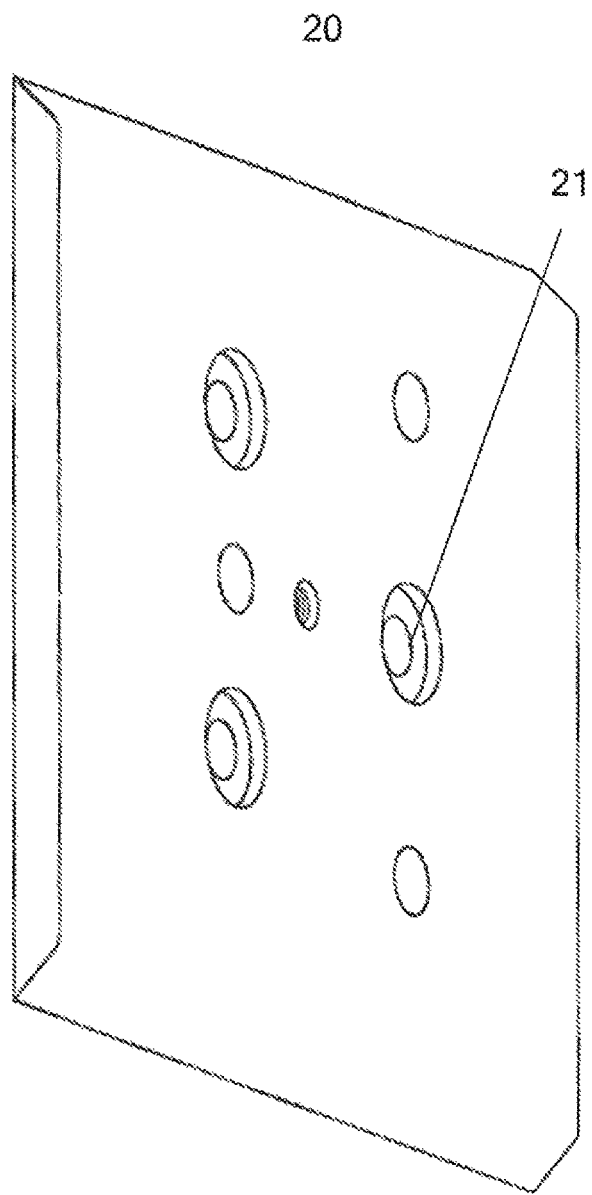
FIG. 7 is a schematic diagram of structure of the support plate in FIG. 2.

In another embodiment of the present invention, as shown in FIG. 7, stepped holes 21 are formed in the support plate 20, one end of each second spring 50 abuts against the inside of the corresponding stepped hole 21, the other end of each second spring abuts against a bolt head of the corresponding bolt and a screw rod of each bolt penetrates the corresponding stepped hole 21. In the embodiment, each second spring is positioned in the stepped hole and abuts against the stepped surface of the stepped hole, so that the radial play of each second spring may be prevented and the adjustment reliability in the calibration stage may be improved.

Figure 2:
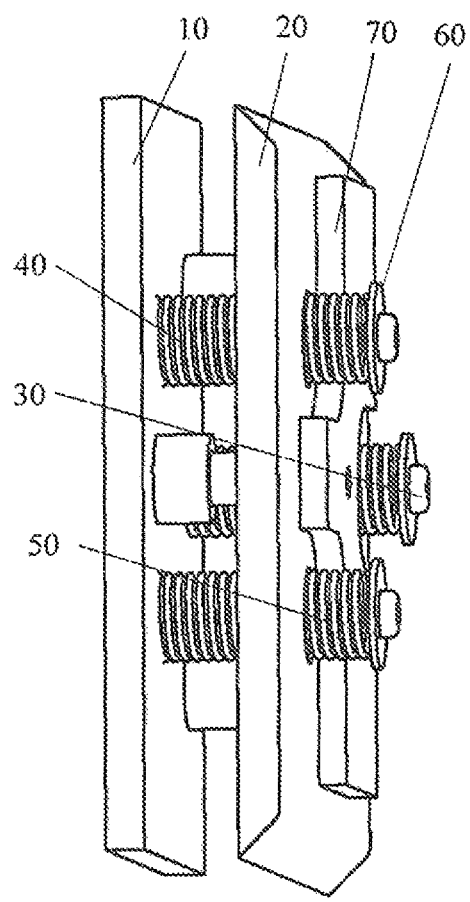
FIG. 2 is a structure schematic diagram of a fixed part of an optical device in FIG. 1.

As shown in FIG. 2 and FIG. 3, spacers 60 are further disposed between the bolt heads of the bolts (as the connecting pieces 30) and the second springs 50.

Figure 4:
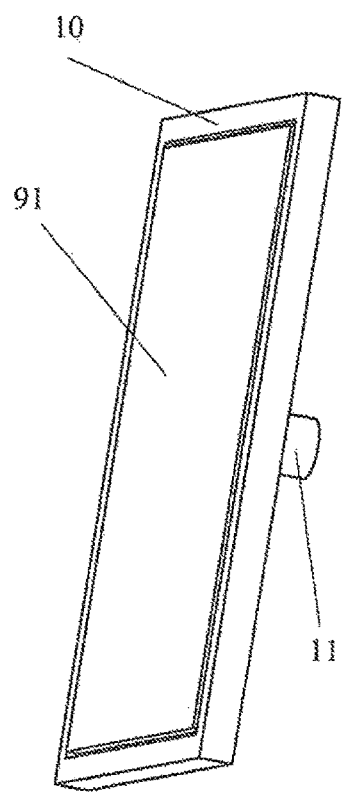
FIG. 4 is a schematic diagram of mounting structure of the optical device and an optical device carrier in FIG. 2.

In one embodiment of the present invention, as shown in FIG. 4, an optical device mounting slot may also be formed in the optical device carrier 10 and the optical device 91 is positioned in the optical device mounting slot. The optical device is mounted in the optical device mounting slot, so that the optical device may be prevented from being damaged by knocking or being broken during installation to thereby protect the optical device.

Figure 6:
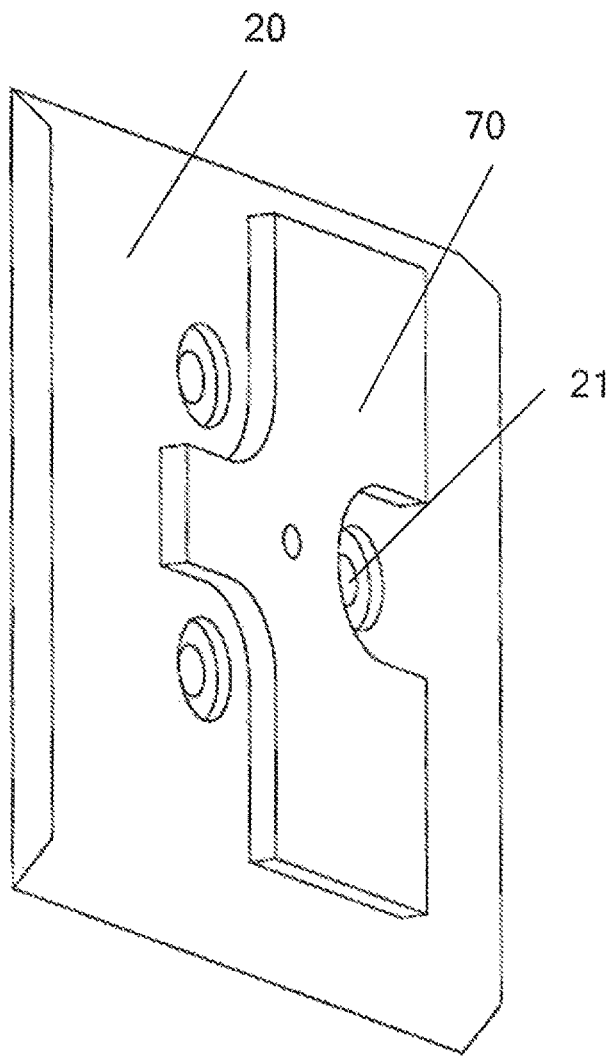
FIG. 6 is a schematic diagram of mounting structure of an auxiliary positioning device and a support plate in FIG. 2.

Optionally, in a certain stage before calibration, as shown in FIG. 2, FIG. 3 and FIG. 6, the optical apparatus further includes an auxiliary positioning device 70, wherein a positioning column 71 is disposed on the auxiliary positioning device 70, a mounting blind hole 72 is formed in the optical device carrier 10, the auxiliary positioning device 70 may be fixed on the support plate 20, and one end of the positioning column 71 penetrates the support plate 20 and then extends into the mounting blind hole 72. In the embodiment, the auxiliary positioning device is used for positioning the bolts, the support plate and the optical device carrier in the mounting process, thereby improving the mounting efficiency of the bolts, the support plate and the optical device carrier, and after the mounting of the bolts, the support plate and the optical device carrier is completed the auxiliary positioning device is dismantled.

Figure 5:
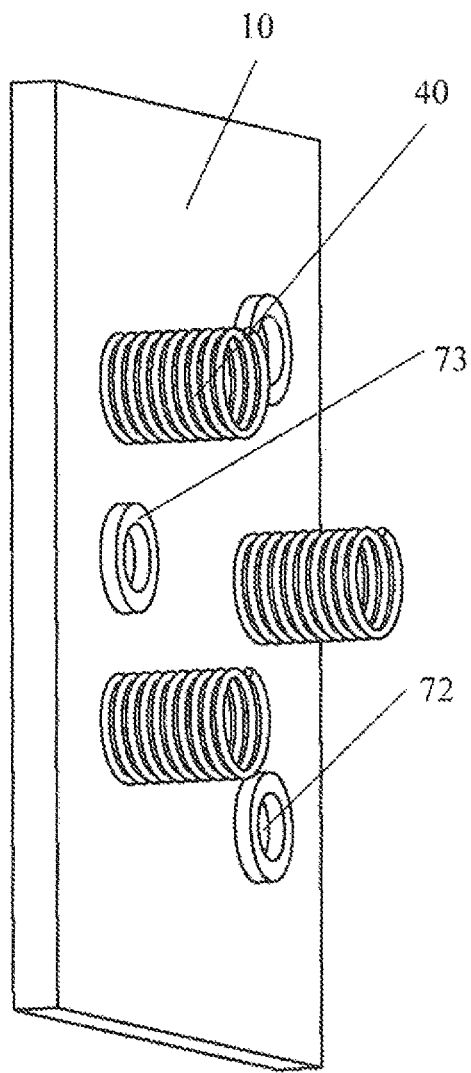
FIG. 5 is a schematic diagram of mounting structure of first springs and an optical device carrier in FIG. 2.

In one embodiment of the present invention, as shown in FIG. 5 and FIG. 8, a boss 73 is disposed on the optical device carrier 10 and the mounting blind hole 72 is formed in the boss 73. In the embodiment, by disposing the boss, the positioning precision of the positioning device may be improved, the assembly efficiency among the bolts, the support plate and the optical device carrier may be improved and the thickness of the optical device carrier may also be reduced to reduce the manufacturing cost of the optical device carrier, wherein the number of the positioning columns 71 and the number of bosses 73 are both three, and the bosses may be cylindrical bosses.

In one embodiment of the present invention, the first springs and the second springs are in a compressed state in the state as shown in FIG. 1 and FIG. 2.

It is worth noting that, the optical apparatus of the present invention has been in a state of after calibration, and the position of the optical device has been fixed. Before the fixation, namely in the calibration stage, the adjustment needs to be performed, and the fixation is further performed after the adjustment is completed, for example, the above way of coating the adhesives is adopted. In order to facilitate the understanding of the present invention, the adjustment process is briefly described as follows: firstly, in the state as shown in FIG. 2, the auxiliary positioning device is removed, and then the right ends of the bolts (as the connecting pieces) in the figure are rotated through a tool. As the left ends of the bolts are in bolt connection with the optical device carrier, the optical device carrier may translate in the left and right direction as shown in the figure. Then, the right ends of the bolts are turned, so that the optical device carrier may deflect at a certain tilt angle. When the spatial position required for the optical device is achieved after the three bolts in the figure are adjusted for a certain purpose, the spatial position of the optical apparatus is fixed through the way of coating the adhesives and the specific coating positions may be the perforation positions where the bolts penetrate the support plate.

In the present invention, the terms "first" and "second" are only used for the purpose of description and may not be understood as indicating or implying the relative importance; and unless otherwise clearly stipulated and limited, the terms "mounting", "connection", "fixation" and the like should be broadly understood, for example, "connection" may be the fixed connection or the detachable connection or the integrated connection. For those of ordinary skill in the art, the specific meanings of the terms in the present invention may be understood according to specific situations.

The above embodiments are only preferred embodiments of the present invention and are not used for limiting the present invention. For those skilled in the art, various changes and variations may be made to the present invention. Any modifications, equivalent substitutions, improvements and the like made within the spirit and the principle of the present invention should be included within the protection scope of the present invention.

The invention claimed is:

1. An optical apparatus, configured to output image information, comprising a housing, a light source, an optical device, which further comprises:
    an optical device carrier, wherein the optical device is mounted on the optical device carrier and positioned on one side of the optical device carrier;
    a support plate positioned on another side of the optical device carrier, is a part of the housing;
    a connecting piece configured to calibrate the relative position of the housing and the optical device carrier, wherein first end of the connecting piece penetrates the support plate and then is connected with the optical device carrier, and after a completion of calibration relative positions of the connecting pieces and the support plate are fixed; and
    a second elastic element, wherein the second elastic element is positioned between a second end of the connecting piece and the support plate;
    wherein the optical apparatus further comprises a first elastic element disposed between the optical device carrier and the support plate; the connecting piece is a bolt, the first elastic element is a first spring and the second elastic element is a second spring;
    wherein the respective numbers of the bolt, the first spring and the second spring are at least three and both of the number of the first elastic element and the number of the second elastic element are the same as that of the bolt; second springs are correspondingly sheathed on bolts;
    wherein studs are disposed on the optical device carrier, first springs are sheathed on the studs and the bolts are capable of being screwed into the studs; and
    stepped holes are formed in the support plate, one end of each second spring abuts against inside of a corresponding one of the stepped holes, the other end of each second spring abuts against a bolt head of a corresponding bolt and a screw rod of each bolt penetrates the corresponding one of the stepped holes.

2. The optical apparatus according to claim 1, wherein number of the second elastic element is no more than that of the connecting piece.

3. The optical apparatus according to claim 1, wherein the optical device carrier is supported on the support plate through the connecting pieces, and connection points of the connecting pieces on the optical device carrier are not positioned on the same straight line.

4. The optical apparatus according to claim 1, wherein adhesives for fixing the connecting piece and the support plate are coated at parts where the connecting piece penetrate the support plate.

5. The optical apparatus according to claim 1, wherein the optical device is a reflector and the optical device carrier is a reflector carrier, and the reflector is positioned in a reflector mounting slot formed in the reflector carrier.

6. The optical apparatus according to claim 1, wherein a via hole is formed in the support plate for enabling the connecting piece to penetrate and an inner diameter of the via hole is larger than outer diameter of a part of the connecting piece positioned in the via hole.

7. The optical apparatus according to claim 6, wherein a boss is disposed on the optical device carrier and a mounting blind hole is formed in the boss.

8. The optical apparatus according to claim 1, wherein the first elastic element are in a compressed state.

9. The optical apparatus according to claim 1, wherein the second elastic element is in a compressed state.

10. The optical apparatus according to claim 1, wherein a first elastic element and the connecting piece are separately disposed, and the first elastic element is supported between the support plate and the optical device carrier.

11. The optical apparatus according to claim 1, wherein a first elastic element is sheathed on the connecting piece and supported between the support plate and the optical device carrier.

12. The optical apparatus according to claim 1, wherein the connecting piece penetrates the support plate and then is in bolt connection with the optical device carrier.

13. The optical apparatus according to claim 1, wherein stepped holes are formed in the support plate, one end of each second elastic element abuts against inside of a corresponding one of the stepped holes, the other end of each second elastic element abuts against a connecting piece head of a corresponding connecting piece and a screw rod of each connecting piece penetrates the corresponding one of the stepped holes.

14. An optical apparatus, configured to output image information, comprising a housing, a light source, an optical device, which further comprises:
an optical device carrier, wherein the optical device is mounted on the optical device carrier and positioned on one side of the optical device carrier;
a support plate positioned on another side of the optical device carrier, is a part of the housing;
a connecting piece configured to calibrate the relative position of the housing and the optical device carrier, wherein first end of the connecting piece penetrates the support plate and then is connected with the optical device carrier, and after a completion of calibration relative positions of the connecting pieces and the support plate are fixed; and
a second elastic element, wherein the second elastic element is positioned between a second end of the connecting piece and the support plate;
wherein the optical apparatus further comprises a first elastic element disposed between the optical device carrier and the support plate; the connecting piece is a bolt, the first elastic element is a first spring and the second elastic element is a second spring;
the respective numbers of the bolt, the first spring and the second spring are less than three and both of the number of the first elastic element and the number of the second elastic element are the same as that of the bolt; second springs are correspondingly sheathed on bolts;
wherein studs are disposed on the optical device carrier, first springs are sheathed on the studs and the bolts are capable of being screwed into the studs; and
stepped holes are formed in the support plate, one end of each second spring abuts against inside of a corresponding one of the stepped holes, the other end of each second spring abuts against a bolt head of a corresponding bolt and a screw rod of each bolt penetrates the corresponding one of the stepped holes.

15. An optical apparatus configured to output image information, comprising a housing, a light source, an optical device, the optical apparatus further comprises:
an optical device carrier, wherein the optical device is mounted on the optical device carrier and positioned on one side of the optical device carrier;
a support plate positioned on another side of the optical device carrier, is a part of the housing;
a connecting piece, wherein first end of the connecting piece penetrates the support plate and then is connected with the optical device carrier, relative positions of the connecting pieces and the support plate are fixed;
a second elastic element, wherein the second elastic element is positioned between a second end of the connecting piece and the support plate; and
a first elastic element disposed between the optical device carrier and the support plate; the connecting piece is a bolt, the first elastic element is a first spring and the second elastic element is a second spring;
wherein both of the number of the first elastic element and the number of the second elastic element are the same as that of the bolt; second springs are correspondingly sheathed on bolts;
studs are disposed on the optical device carrier, first springs are sheathed on the studs and the bolts are capable of being screwed into the studs; and
stepped holes are formed in the support plate, one end of each second spring abuts against inside of a corresponding one of the stepped holes, the other end of each second spring abuts against a bolt head of a corresponding bolt and a screw rod of each bolt penetrates the corresponding one of the stepped holes.

* * * * *